Patented Aug. 25, 1942

2,293,804

UNITED STATES PATENT OFFICE 2,293,804

MONOAZO DYESTUFFS AND THEIR MANUFACTURE

Achille Conzetti, Basel, and Otto Schmid, Muttenz, near Basel, Switzerland, assignors to the firm J. R. Geigy A. G., Basel, Switzerland No Drawing. Application July 24, 1940, Serial No. 347,310. In Switzerland August 11, 1939

6 Claims. (Cl. 260—196)

This invention relates to the manufacture of monoazo-dyestuffs which dye wool by the afterchroming method green tints of excellent fastness to fulling, very good fastness to light and good fastness to hot-pressing by coupling a diazotised 2-aminophenol-4-sulphonic acid free from nitro groups which contain in 5- or 6-position a halogen or alkyl-group, with 2-aminonaphthalene-3-carboxylic acid preferably in a medium neutral to Congo in presence of pyridine and at a slightly raised temperature.

It is known that the monoazo-dyestuffs derived from diazotized ortho-aminophenol sulphonic acids and 2-aminonaphthalene-3-carboxylic acid and free from nitro groups yield on wool by the after-chrome process green dyeings of very good fastness to light and fulling. The known monoazo-dyestuff from diazotised 4-chloro-2-aminophenol-6-sulphonic acid and 2-aminonaphthalene-3-carboxylic acid has however the great disadvantage that in the chroming operation using hexavalent chromium by the usual method quite different colour tints are obtained depending upon the acidity of the dye-bath, which colours may vary from green over olive-green to yellow-green. Still more sensitive is the monoazo-dyestuff from diazotised 4-chloro-2-aminophenol-5-sulphonic acid and 2-aminonaphthalene-3-carboxylic acid.

It is therefore quite surprising and could not be foreseen that by means of a definite choice and arrangement of the substituents in the diazocomponent this undesired property of variability of colour tint which diminishes the practical value of these otherwise valuable dyestuffs is not only in part substantially diminished, but practically eliminated.

The following example illustrates the invention, the parts being by weight:

22.35 parts by weight of 5-chloro-2-aminophenol-4-sulphonic acid are diazotised in the usual manner and the mass is mixed with pyridine until the reaction to Congo disappears. The yellow diazo solution is then added drop by drop, while stirring, at 45–50° C. to a solution of sodium salt of 18.7 parts of 2-aminonaphthalene-3-carboxylic acid in 100 parts of water. The coupling is rapidly complete. The dyestuff which partially crystallises from the solution in beautiful brown-red needles is completely precipitated by salting out and then filtered with suction and dried. There is obtained a brown-red powder soluble in water to a yellow-red solution and in concentrated sulphuric acid to a red-violet solution. The dyestuff dyes wool in acid bath yellow-red tints which by after-chroming in the usual manner pass into green tints of very good fastness to light and excellent fastness to fulling. If instead of the 5-chloro-2-aminophenol-4-sulphonic acid there is used the isomeric 6-chloro-compound, there results a dyestux having very similar properties.

The following table shows the properties of other dyestuffs produced with 2-aminonaphthalene-3-carboxylic acid as coupling component:

| Diazo-components | Colour of the dyeing on wool | |
|---|---|---|
| | Acid | After-chromed |
| 5-methyl-2-aminophenol-4-sulphonic acid. | Yellow-red | Olive. |
| 6-methyl-2-aminophenol-4-sulphonic acid. | ....do.... | Olive-green. |

If desired the dyestuffs may be produced in the presence of other agents which facilitate the coupling, for example naphthalene sulphonic acid.

What we claim is:

1. A process for the manufacture of monoazodyestuffs, comprising coupling nitro-group free diazotised aminophenol-sulphonic acids of the group consisting of 5-chloro-2-aminophenol-4-sulphonic acid, 6-chloro-2-aminophenol-4-sulphonic acid, 5-methyl-2-aminophenol-4-sulphonic acid and 6-methyl-2-aminophenol-4-sulphonic acid with 2-aminonaphthalene-3-carboxylic acid.

2. A process for the manufacture of a monoazodyestuff, comprising coupling diazotised 5-chloro-2-aminophenol-4-sulphonic acid with 2-aminonaphthalene-3-carboxylic acid.

3. A process for the manufacture of a monoazodyestuff, comprising coupling diazotised 6-methyl-2-aminophenol-4-sulphonic acid with 2-aminonaphthalene-3-carboxylic acid.

4. The monoazodyestuffs of the following general formula

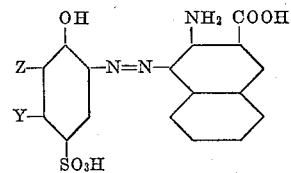

where one of Z and Y represents a member of the group consisting of Cl and CH₃, and the other one of Z and Y represents hydrogen, yielding on wool by afterchroming substantially green shades of very good fastness to light and fulling.

5. The monoazodyestuff of the formula

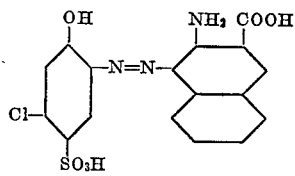

yielding on wool by afterchroming green shades of very good fastness to light and fulling.

6. The monoazodyestuff of the formula

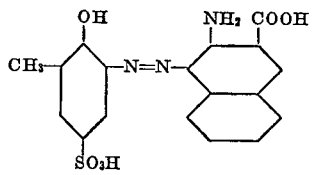

yielding on wool by afterchroming olive-green shades of very good fastness to light and fulling.

ACHILLE CONZETTI.
OTTO SCHMID.